US 7,738,412 B2

(12) United States Patent
Hamalainen et al.

(10) Patent No.: US 7,738,412 B2
(45) Date of Patent: Jun. 15, 2010

(54) POWER CHANGE ESTIMATION FOR COMMUNICATION SYSTEM

(75) Inventors: Ari Hamalainen, Vantaa (FI); Janne Laakso, Helsinki (FI); Kimmo Valkealahti, Helsinki (FI)

(73) Assignee: Nokia Corporation, Espoo (FI)

( * ) Notice: Subject to any disclaimer, the term of this patent is extended or adjusted under 35 U.S.C. 154(b) by 921 days.

(21) Appl. No.: 10/432,226

(22) PCT Filed: Nov. 23, 2001

(86) PCT No.: PCT/EP01/13748

§ 371 (c)(1),
(2), (4) Date: Nov. 4, 2003

(87) PCT Pub. No.: WO02/45292

PCT Pub. Date: Jun. 6, 2002

(65) Prior Publication Data

US 2004/0063434 A1    Apr. 1, 2004

(30) Foreign Application Priority Data

Nov. 28, 2000  (GB)  .................................. 0029003.1

(51) Int. Cl.
*H04B 7/185* (2006.01)

(52) U.S. Cl. ................. 370/318; 370/465; 370/252; 455/522; 455/67.11; 455/69

(58) Field of Classification Search ............. 370/329, 370/318, 465, 468, 252; 455/522, 67.11, 455/69

See application file for complete search history.

(56) References Cited

U.S. PATENT DOCUMENTS

| 4,811,421 A | | 3/1989 | Havel et al. | |
| 5,305,468 A | * | 4/1994 | Bruckert et al. | ............... 455/69 |
| 5,886,988 A | | 3/1999 | Yun et al. | |
| 6,047,189 A | | 4/2000 | Yun et al. | |
| 6,067,446 A | * | 5/2000 | Persson et al. | ................ 455/69 |
| 2003/0206600 A1 | * | 11/2003 | Vankka | ........................ 375/261 |

FOREIGN PATENT DOCUMENTS

| JP | 2000276460 | * | 6/2000 |
| JP | 2000-276460 | | 10/2000 |
| WO | WO 98/02981 | | 1/1998 |
| WO | WO 00/04739 | | 1/2000 |

(Continued)

OTHER PUBLICATIONS

"Fuzzy/Neural Congestion Control for Integrated Voice and Data DS-CDMA/FRMA Cellular Networks", Chang et al, IEEE Journal of Selected Areas in Communications, vol. 18, No. 2, Feb. 2000; pp. 283-293, XP000912948.

(Continued)

*Primary Examiner*—Vincent P Harper
*Assistant Examiner*—Dung Lam
(74) *Attorney, Agent, or Firm*—Squire, Sanders & Dempsey L.L.P.

(57) ABSTRACT

There is disclosed a technique for estimating a power change, particularly a power increase, in a communication system caused by a change in the load in the system. The technique particularly relates to a mobile communication system.

23 Claims, 1 Drawing Sheet

FOREIGN PATENT DOCUMENTS

| WO | WO 00/51390 | 8/2000 |
|---|---|---|
| WO | WO 02/27969 A2 | 4/2002 |

OTHER PUBLICATIONS

Harri Holma and Janne Laakso, Uplink Admission Control and Soft Capacity with MCD in CDMA, 1999, pp. 431-435.

Simon Haykin, Neural Networks, A Comprehensive Foundation; Second Edition, Publisher: Tom Robbins.

Edited by: Harri Holma and Antti Toskala, WCDMA for UMTS, Radio Access for Third Generation Mobile Communications, John Wiley and Sons, 2000.

\* cited by examiner

POWER CHANGE ESTIMATION FOR COMMUNICATION SYSTEM

FIELD OF THE INVENTION

The present invention relates to a technique for providing an estimate of the power change in a communication system responsive to a change in the load in the system, and particularly to a mobile communication system, and particularly but not exclusively to a power increase.

BACKGROUND TO THE INVENTION

In mobile communication systems, there is a general requirement to allocate system resources as efficiently as possible based on the number of users in the system and their needs. For example in the wide-band code division multiple access (W-CDMA) systems the optimised management of radio resources requires means for predicting how any change in call configurations affects the signal powers in the cell.

Up-link power increase estimation (PIE) is used to estimate how much the total wide-band interference power changes when the cell load changes. The cell load may change for example due to admission control or due to packet scheduling.

Admission control allows a new user into the radio access network (RAN) if the admission does not cause an excessive interference in the system. Before a new user is admitted to the system, an admission control algorithm estimates the increase in the total interference level due to a new user. This is achieved by using an up-link power increase estimation method.

The packet scheduler allocates up-link packet bit rates to data users by also using the up-link power increase estimation method. By using the up-link power increase estimation method, the packet scheduler estimates by how much the requested/allocated bit rates will increase the noise/interference level. Typically this estimation is also done using a power increase estimation method.

The degree of resource usage in the cell is thus measured with the total received power in the up-link and with the total transmission power in the down-link, which both have particular limits that specify their full usage. In order to distribute system capacity to users optimally, the consumption of each user should be predicted as well as possible prior to the actual admission in the use of capacity. The mapping of call configuration to the signal power depends on diverse factors that change in time.

The power increase estimation methods currently used involve a fixed mathematical formula which is an approximation of the true physical behaviour. As a result of this approximation, the fixed formula provides an error margin in its estimation.

These error margins introduce wasted capacity. If the power increase estimation can estimate the noise rise caused more accurately, the less there is wasted capacity.

It is an aim of the present invention to provide an improved technique for determining a power increase estimation.

SUMMARY OF THE INVENTION

In a first aspect the present invention provides a method of predicting a change in power requirements in the air interface in a communication system, comprising: estimating a new power level based on a proposed change in loading; implementing the change in loading; measuring a power level following implementation of the change; determining an error between the estimated and measured power levels, and adapting the estimation step based on the determined error.

The change in power requirements may be due to a change in up-link received interference. The change in power requirements may be due to a change in down-link transmission power.

The proposed change in loading may be due to the admission of a new user. The proposed change in loading may be due to the allocation of a new data rate to a packet-switched user.

The power requirements may be determined by the total received power in the up-link and the total transmitted power in the down-link.

The total received power in the up-link may be determined by any one of the total interference in the cell, the noise floor, the user data rate, the rate of change of the user data rate, or the Eb/Io level of the service. The total transmitted power in the down-link may determined by any one of the total transmission power in the cell, the user data rate, the rate of change of the user data rate, or the required Eb/Io level of service.

The step of estimating the new power level may utilise a neural network. The step of estimating the new power level may utilise a linear estimator.

In a second aspect the present invention provides a control means for determining a change in power requirements in the air interface of a communication system, comprising: mean for estimating a new power level based on a proposed change in loading; means for implementing the change in loading; means for measuring a power level following implementation of the change; means for determining an error between the estimated and measured power levels; and means for adapting the estimation step based on the determined error.

The means for estimating a new power level may comprise a power increase estimator. The means for implementing the change in loading may comprise a packet scheduler. The means for measuring a power level may comprise a load controller. The power increase estimator may further comprise the means for determining the error.

In a third aspect the present invention provides a controller for determining a change in power requirements in the air interface of a communication system, comprising: a power increase estimator for estimating a new power level based on a proposed change in loading; a packet scheduler for implementing the change in loading; and a load controller for measuring a power level following implementation of the change; wherein the power increase estimator further determines an error between the estimated and measured power levels, and adapts the estimated based on the determined error.

In a fourth aspect the present invention provides, in a mobile communication system, control means for determining method a change in power requirements in the air interface of a communication system, comprising: mean for estimating a new power level based on a proposed change in loading; means for implementing the change in loading; means for measuring a power level following implementation of the change; means for determining an error between the estimated and measured power levels; and means for adapting the estimation step based on the determined error.

The control means may be provided in a radio network controller of a W-CDMA communication system.

Thus the invention provides a technique for estimating the change in up-link received interference or down-link transmission power for any anticipated change in cell loading. The cell load change may be, for example, due to the admission of new user or the allocation of data rates to packet switched users.

The invention advantageously provides the radio resource management logic of the radio network controller with efficient means to distribute available radio resource. As a result, the invention provides improved call quality, improved system stability, and higher throughput with lower system interference.

BRIEF DESCRIPTION OF THE DRAWINGS

The invention will be best understood by way of example with reference to the accompanying drawings in which.

DESCRIPTION OF PREFERRED EMBODIMENTS

Figure 1:
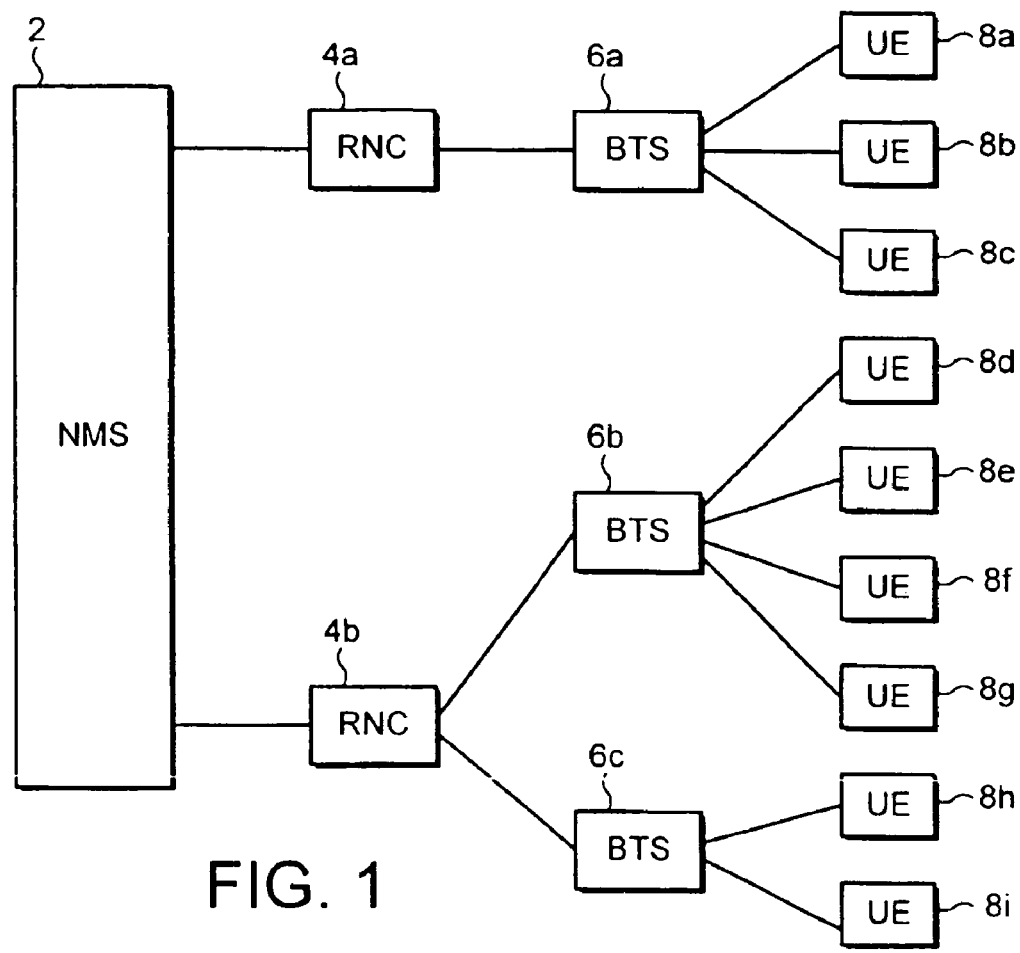
FIG. 1 is a block diagram of an example W-CDMA system.

Referring to FIG. 1 there is illustrated the general structure of an exemplary mobile communication system, with reference to which the present invention will be described. It will be understood, however, that the invention is not limited in its applicability to the specific structure shown in FIG. 1.

A plurality of base transceiver stations (BTS) 6 each support a plurality of mobile stations or user equipment (UE) 8. Each base transceiver station 6 is supported by a radio network controller (RNC) 4. Each radio network controller 4 is connected to a network management system (NMS) 2.

Figure 2:
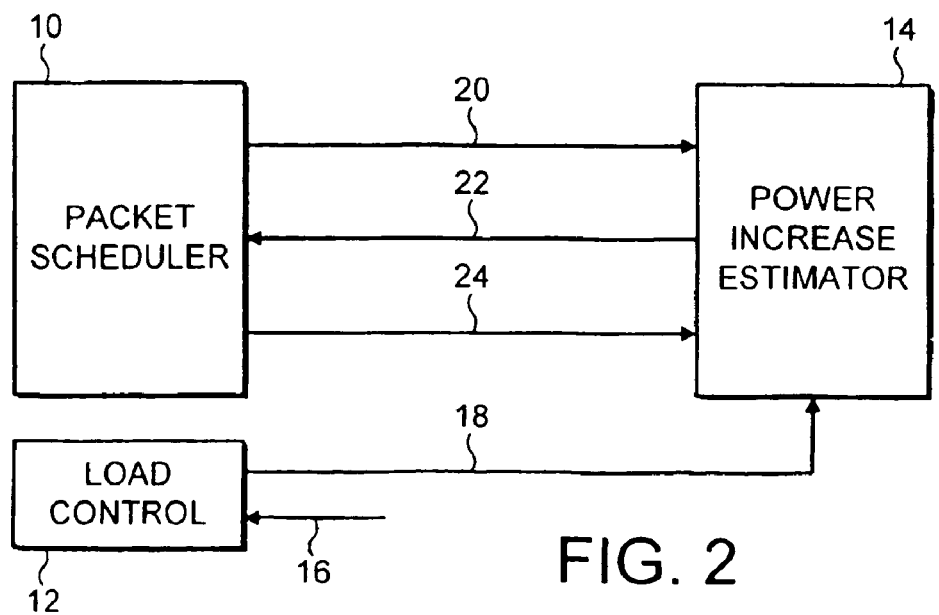
FIG. 2 is a block diagram of the functional elements of a radio network controller for implementing an embodiment of the invention.

The power increase estimation method in accordance with the present invention is implemented in the radio network controller 4 of FIG. 1. Referring to FIG. 2 there is illustrated the functional blocks of the radio network controller necessary for implementing the present invention. It will be appreciated that the radio network controller also comprises further functional blocks necessary for its operation, but which are not relevant to the present invention.

Referring to FIG. 2 there is illustrated a packet scheduler 10, a load control block 12 and a power increase estimator 14. The load control block receives on line 16 load measurements from the base transceiver stations 6 with which it is associated.

The load control block then determines the current load by measuring the measurements received from the base transceiver stations.

The packet scheduler allocates bit rates or data rates to new users admitted to the part of the network associated with the radio network controller, and also re-allocates bit rates to existing users in accordance with changes in the network load, for example due to users leaving the network.

The power increase estimator estimates, in accordance with the present invention, a change in the network load due to changes in allocated bit rates made by the packet scheduler.

A specific example of the operation of the functional blocks of FIG. 2 will be given further hereinbelow. Firstly an overview of the operation of the functional blocks of FIG. 2 is given.

Responsive to a change in network load caused by, for example, a new user entering the network, the packet scheduler 10 re-allocates the bit rates for existing users and allocates a bit rate to the new user. The packet scheduler then provides these up-link and down-link bit rates as proposed bit rates or candidate bit rates on line 20 to the power increase estimator (PIE). The power increase estimator 14, using these candidate bit rates, calculates an estimate of both the total received up-link interference, and the total transmitted down-link power. These estimates are made in the power increase estimator using known fixed formula from making such estimations, in accordance with the prior art.

Such known fixed functions provide a power estimate as a function of measured parameters and configuration parameters. In the up-link, these parameters may include: the total interference power in the cell; the noise floor; the user data rate; the rate of change of the user data rate; and the required Eb/Io level of service. In the down-link, these parameters may include: the total transmission power in the cell; the user data rate; the rate of change of the user data rate; and the required Eb/Io level of service.

The power increase estimator then provides these estimated values on line 22 to the packet scheduler 10. The packet scheduler compares these estimated values to stored threshold values. If the estimates are below the threshold values for the respective values, then the packet scheduler may allocate increased bit-rate values in the up-link or the down-link and provide these to the power increase estimator 14 as candidate values on line 20. If responsive thereto the packet scheduler determines that the estimated values on line 22 exceed the threshold values, the packet scheduler reverts to its previous candidate values and selects them as the allocated up-link and down-link bit rates. The allocated up-link and down-link bit rates are transmitted to the base transceiver stations and the user equipment in the network by the radio network controller by mean well-known in the art and not illustrated in FIG. 2.

In addition, the packet scheduler 10 provides the allocated up-link and down-link bit rates on line 24 to the power increase estimator 14.

Thereafter, and once the new allocated bit rates have been implemented, the power increase estimator receives on line 18 from the load control block 12 the actual total received interface and the actual total transmission power for the network. These are the actual values detected after the change in bit rates determined by the packet scheduler 10 have been implemented.

Responsive thereto the power increase estimator provides a revised estimation on line 22 to the packet scheduler 10 based on the actual change in power levels. Responsive to the revised estimate, the process of re-allocating bit rates may be repeated, possibly resulting in increased bit rates being allocated and the efficiency of the system thereby being improved.

Thus in accordance with the present invention a much more accurate estimate of the effect of load change can be obtained, such that the available system capacity can be used much more efficiently.

The power estimation function in accordance with the present invention is parameterised such that its specific definition can be adapted in time in order to minimise the error between the predicted and he realised powers. The adaptation is performed continuously in order to respond to changing conditions in the cell. The technique according to the present invention can adapt to diverse conditions in the air interface. This provides the radio resource logic in the radio network controller with efficient means to distribute the available radio resource. This also facilitates improved radio network planning.

An example implementation of a technique according to the present invention is provided hereinafter with reference to the example of a linear model.

In the first part of the linear model, it is necessary to consider an adaptation algorithm. A number of terms are defined as follows.

$\overline{P}_{rx, total}(k)$ The averaged estimate of the total received uplink interference in watts. The load control block obtains the average and provides its value in 100-ms intervals, that is, Time(k)−Time(k−1)=100 ms.

$\overline{P}_{rx,\ total}(k)$ The averaged estimate of the total received uplink interference in watts. The load control obtains the average and provides its value in 100-ms intervals.

L(k) The packet load allocated by the packet scheduler (PS). The packet load allocation is performed in 500-ms intervals. In the up-link:

$$L_{UL}(k) = \sum_{i=1}^{\#\ Packet\ users} \frac{E_i \cdot R_i}{W + E_i \cdot R_i},$$

and in the down-link:

$$L_{DL}(k) = \sum_{i=1}^{\#\ Packet\ users} \frac{E_i \cdot R_i}{W},$$

in which Ri is the allocated bit rate (from the PS), Ei is the required bit-energy-to-interference-density ratio (cell parameter), and W is the chip rate (system parameter).

The radio resource management unit provides the adaptation algorithm, located in the radio network controller, with the values above. If a packet allocation was made at time instant k−1, the adaptation algorithm is executed at time instant k as follows:

1. Compute packet load change ΔL=L(k−1)−L(k−2) and the corresponding measured change in received interference $\Delta P_{UL} = \log \overline{P}_{rx,\ total}(k) - \log \overline{P}_{rx,\ total}(k-1)$ or in total transmission power $\Delta P_{DL} = \overline{P}_{tx,\ total}(k) - \overline{P}_{tx,\ total}(k-1)$. Note the logarithm of interferences.

2. Adapt the slope estimate C(k)=C(k−1)+α·[ΔP−C(k−1)·ΔL]·ΔL, in which α is a small constant, e.g., α=0.01. Slope C(k) converges to value that minimizes the expectation of (ΔP−C·ΔL)² (Robbins-Monro stochastic approximation).

In the second part of the linear model, the power change prediction is made. The adaptation algorithm provides the packet scheduler with the up-link and down-link slope estimates CUL(k) and CDL(k). For a prospective change in the packet load $\Delta \tilde{L}$, the packet scheduler can predict the ensuing received interference or total transmission power with the following formulas:

$$\tilde{P}_{rx,\ total}(k+1) = \overline{P}_{rx,\ total}(k) \cdot 10^{C_{UL}(k) \cdot \Delta \tilde{L}_{UL}} \quad \text{(uplink)}$$

$$\tilde{P}_{tx,\ total}(k+1) = \overline{P}_{tx,\ total}(k) + C_{DL}(k) \cdot \Delta \tilde{L}_{DL} \quad \text{(downlink)}$$

If the predicted value does not exceed the limit (or threshold) value then the packet scheduler can consider the allocation of a higher load.

The above example is only one possible implementation of the present invention, and many other techniques may be utilised.

For example, a multi-layer perception neural network could implement the estimation function. The inputs to such a neural network could be any one of the measured power, the data rate, the change of data rate, and the required Eb/Io level. The network output may be the estimate for the new power level that is used, for instance, in admission control or packet scheduling. After the admission, the realised power may be measured. The network is then adapted, in accordance with the present invention, according to the difference between the predicted and realised powers to reduce error.

Although the invention has been described herein with reference to a particular example application of a W-CDMA system, such as a UMTS (universal mobile telecommunications system) it is not so limited, and may equally advantageously be used in other types of mobile communication system.

The invention claimed is:

1. A method, comprising:
using a power estimation function to estimate a new power level based on a proposed change in cell loading due to an allocation of a new data rate to at least one packet switched user in a wireless communication system by repeatedly performing at least the following,
receiving information related to a measured power level following implementation of the proposed change,
determining an error between the estimated and measured power levels,
adapting parameters of the power estimation function based on the determined error to thereby adapt the relationship between proposed changes in cell loading and estimated power levels of the power estimation function, and
responsive to said determined error re-allocating a data rate to said at least one packet switched user,
wherein for a further proposed change in cell loading the power levels are estimated with the adapted power estimation function.

2. The method according to claim 1, wherein a change in power requirements is due to a change in up-link received interference.

3. The method according to claim 1, wherein a change in power requirements is due to a change in down-link transmission power.

4. The method according to claim 1, wherein the location of a new data rate is due to an admission of a new user.

5. The method according to claim 1, wherein power requirements are determined by a total received power in an up-link and a total transmitted power in a down-link.

6. The method according to claim 5, wherein the total received power in the up-link is determined by any one of a total interference in a cell, a noise floor, a user data rate, a rate of change of the user data rate, or an Eb/Io level of service.

7. The method according to claim 5, wherein the total transmitted power in the down-link is determined by any one of a total transmission power in a cell, a user data rate, a rate of change of the user data rate, or a required Eb/Io level of service.

8. The method according to claim 1, wherein using the power estimation function to estimate the new power level utilizes a neural network.

9. The method according to claim 1, wherein using the power estimation function to estimate the new power level utilizes a linear estimator.

10. The method according to claim 1, wherein the method is implemented in a wideband code division multiple access system.

11. An apparatus, comprising:
estimating means for estimating a new power level based on a proposed change in cell loading due to an allocation of a new data rate to at least one packet switched user in a wireless communication system using a power estimation function; and
performing means for repeatedly performing at least the following steps,
receiving information relating to a measured power level following implementation of the proposed change, determining an error between the estimated and measured power levels adapting the parameters of the power estimation function based on the determined error to thereby adapt the relationship between proposed changes in cell loading and estimated power levels of the power estimation function, and responsive to said determined error re-allocating a data rate to said at least one packet switched user, wherein for a further proposed change in cell loading the power levels are estimated with the adapted power estimation function.

12. The apparatus according to claim 11, wherein the estimating means for estimating a new power level comprises a power increase estimator.

13. The apparatus according to claim 12, wherein the estimating means for estimating a power level comprises a load controller.

14. The apparatus according to claim 12, wherein the power increase estimator further comprises determining means for determining the error.

15. An apparatus, comprising:
a power increase estimator configured to estimate a new power level based on a proposed change in cell loading due to an allocation of a new data rate to at least one packet switched user in a wireless communication system using a power estimation function;
a load controller configured to repeatedly receive information relating to a measured power level following implementation of the change,
wherein the power increase estimator is further configured to repeatedly determine an error between the estimated and measured power levels, and to repeatedly adapt the parameters of the power estimation function based on the determined error to thereby adapt the relationship between proposed changes in cell loading and estimated power levels of the power estimation function; and
a packet scheduler configured to re-allocate a data rate to said at least one packet switched user responsive to said determined error,
wherein for a further proposed change in cell loading the power levels are estimated with the adapted power estimation function.

16. The apparatus according to claim 15, wherein the allocation of a new data rate is due to an admission of a new user.

17. The apparatus according to claim 15, wherein the power increase estimator is further configured to utilize a neural network.

18. The apparatus according to claim 15, wherein the power increase estimator is further configured to utilize a linear estimator.

19. The apparatus according to claim 15, wherein the apparatus is implemented in a wideband code division multiple access system.

20. A system, comprising:
estimating means for estimating a new power level based on a proposed change in cell loading due to an allocation of a new data rate to at least one packet switched user in a wireless communication system using a power estimation function; and
performing means for repeatedly performing at least the following steps,
implementing the proposed change in cell loading,
measuring the power level following implementation of the proposed change,
determining an error between the estimated and measured power levels,
adapting parameters of the power estimation function based on the determined error to thereby adapt the relationship between proposed changes in cell loading and estimated power levels of the power estimation function, and
responsive to said determined error re-allocating a data rate to said at least one packet switched user,
wherein for a further proposed change in cell loading the power levels are estimated with the adapted power estimation function.

21. A method, comprising:
using a power estimation function to estimate a new power level based on a proposed change in cell loading due to an allocation of a new data rate to at least one packet switched user in a wireless communication system;
repeatedly performing at least the following,
implementing the proposed change in cell loading,
measuring a power level following implementation of the proposed change,
determining an error between the estimated and measured power levels,
adapting parameters of the power estimation function based on the determined error to thereby adapt the relationship between proposed changes in cell loading and estimated power levels of the power estimation function, and
responsive to said determined error re-allocating a data rate to said at least one packet switched user,
wherein for a further proposed change in cell loading the power levels are estimated with the adapted power estimation function.

22. An apparatus, comprising:
estimating means for estimating a new power level based on a proposed change in cell loading due to an allocation of a new data rate to at least one packet switched user in a wireless communication system using a power estimation function; and
performing means for repeatedly performing the following steps,
implementing the change in cell loading,
measuring a power level following implementation of the proposed change,
determining an error between the estimated and measured power levels,
adapting the parameters of the power estimation function based on the determined error to thereby adapt the relationship between proposed changes in cell loading and estimated power levels of the power estimation function, and
responsive to said determined error re-allocating a data rate to said at least one packet switched user,
wherein for a further proposed change in cell loading the power levels are estimated with the adapted power estimation function.

23. An apparatus, comprising:
a power increase estimator configured to estimate a new power level based on a proposed change in cell loading due to an allocation of a new data rate to at least one packet switched user in a wireless communication system using a power estimation function;
a packet scheduler configured to repeatedly implement the change in cell loading; and
a load controller configured to repeatedly measure a power level following implementation of the change,
wherein the power increase estimator is further configured to repeatedly determine an error between the estimated and measured power levels, and to repeatedly adapt parameters of the power estimation function based on the determined error to thereby adapt the relationship between proposed changes in cell loading and estimated power levels of the power estimation function, wherein, responsive to said determined error, the packet scheduler is configured to re-allocate a data rate to said at least one packet switched user, wherein for a further proposed change in cell loading the power levels are estimated with the adapted power estimation function.

* * * * *